United States Patent [19]

Jacobson et al.

[11] Patent Number: 5,542,493
[45] Date of Patent: Aug. 6, 1996

[54] HALL EFFECT SENSOR ASSEMBLY

[75] Inventors: Scott B. Jacobson, Kindred; Kenneth A. Brandt, Fargo, both of N. Dak.

[73] Assignee: Clark Equipment Company, Woodcliff Lake, N.J.

[21] Appl. No.: 199,827

[22] Filed: Feb. 22, 1994

[51] Int. Cl.$^6$ .................................................. B60K 28/04
[52] U.S. Cl. ........................................ 180/272; 180/273
[58] Field of Search .................................. 180/272, 273, 180/271

[56] References Cited

U.S. PATENT DOCUMENTS

| | | | |
|---|---|---|---|
| 2,359,254 | 9/1944 | Silver | 200/85 |
| 2,606,626 | 8/1952 | Meyer | 180/82 |
| 3,215,221 | 11/1965 | Rayman | 180/82 |
| 3,340,523 | 9/1967 | Whitman | 340/278 |
| 3,449,714 | 6/1969 | Farley, Jr. | 340/52 |
| 3,455,410 | 7/1969 | Wilson | 180/82 |
| 3,487,451 | 12/1969 | Fontaine | 303/19 |
| 3,500,946 | 3/1970 | Boyajian | 180/101 |
| 3,507,350 | 4/1970 | Boyajian | 180/101 |
| 3,740,711 | 6/1973 | Bell | 340/52 |
| 3,749,866 | 7/1973 | Tizakun et al. | 200/85 |
| 3,787,804 | 1/1974 | MacDonald | 340/52 |
| 3,788,431 | 1/1974 | York | 188/109 |
| 3,790,223 | 2/1974 | Fontaine | 303/19 |
| 3,838,748 | 10/1974 | Gray et al. | 180/101 |
| 3,864,668 | 2/1975 | Bickford | 340/52 |
| 3,892,294 | 7/1975 | Nieminski | 188/109 |
| 3,912,939 | 10/1975 | Quantz et al. | 307/10 |
| 3,927,776 | 12/1975 | Steiger | 214/140 |
| 3,960,235 | 6/1976 | Iijima | 180/82 |
| 3,986,093 | 10/1976 | Wakamatsu et al. | 318/484 |
| 4,019,602 | 4/1977 | Habiger | 180/101 |
| 4,059,196 | 11/1977 | Uchino et al. | 214/138 |
| 4,091,889 | 5/1978 | Brown et al. | 180/101 |
| 4,096,468 | 6/1978 | Kopera, Jr. | 340/52 |
| 4,103,842 | 8/1978 | Martin et al. | 242/107 |
| 4,116,296 | 9/1978 | Pleier et al. | 180/101 |
| 4,172,980 | 10/1979 | Hsieh et al. | 307/9 |
| 4,267,544 | 5/1981 | Wiblin | 338/32 |
| 4,285,418 | 8/1981 | Paine | 188/109 |
| 4,296,410 | 10/1981 | Higgs et al. | 340/686 |
| 4,313,519 | 2/1982 | Lipschutz | 180/270 |
| 4,317,500 | 3/1982 | Bening | 180/273 |
| 4,320,819 | 3/1982 | Erker | 188/109 |
| 4,344,502 | 8/1982 | Terabayashi | 180/268 |
| 4,355,698 | 10/1982 | Barnes et al. | 180/273 |
| 4,361,741 | 11/1982 | Leskoverc et al. | 200/85 |
| 4,371,741 | 2/1983 | Ando et al. | 174/15 |
| 4,385,863 | 5/1983 | Minor | 414/699 |
| 4,388,980 | 6/1983 | Vig et al. | 180/271 |
| 4,389,154 | 6/1983 | Minor et al. | 414/699 |
| 4,391,344 | 7/1983 | Weber et al. | 180/271 |
| 4,392,544 | 7/1983 | Dilno | 180/273 |
| 4,397,371 | 8/1983 | Lynnes et al. | 180/271 |
| 4,398,618 | 8/1983 | Hansen | 180/273 |
| 4,466,504 | 8/1984 | Giandenoto et al. | 180/273 |
| 4,480,713 | 11/1984 | Macht et al. | 180/268 |
| 4,546,266 | 10/1985 | Zenick et al. | 307/10 |
| 4,550,597 | 11/1985 | Drutchas et al. | 73/118 |
| 4,579,191 | 4/1986 | Klee et al. | 180/268 |
| 4,655,313 | 4/1987 | Hicks | 180/273 |
| 4,673,054 | 6/1987 | Burke et al. | 180/271 |
| 4,706,194 | 11/1987 | Webb et al. | 364/424 |
| 4,759,185 | 7/1988 | McConnell et al. | 60/444 |

(List continued on next page.)

OTHER PUBLICATIONS

"Fluid Power in Action: Mobile Equipment" by R. T. Schneider, Aug. 1983 *Hydraulics & Pneumatics*, pp. 29–32.

*Primary Examiner*—Eric D. Culbreth
*Attorney, Agent, or Firm*—Westman, Champlin & Kelly, P.A.

[57] ABSTRACT

A sensor for a power machine includes a seat bar which is movably coupled relative to a seat on the power machine. A magnet and a Hall effect sensor are coupled to the seat bar and to the power machine so that they are movable relative to one another based on movement of the seat bar. The seat bar is movable from a first position to a second position. The Hall effect sensor provides a position sensing signal indicating when the seat bar is in one of the first or second positions.

9 Claims, 4 Drawing Sheets

U.S. PATENT DOCUMENTS

| | | | |
|---|---|---|---|
| 4,771,269 | 9/1988 | Patsy et al. | 200/61.69 |
| 4,796,013 | 1/1989 | Yasuda et al. | 340/562 |
| 4,844,196 | 7/1989 | Clevenger, Jr. et al. | 180/273 |
| 4,856,612 | 8/1989 | Clevenger, Jr. et al. | 180/273 |
| 4,871,044 | 10/1989 | Strosser et al. | 180/273 |
| 4,902,039 | 2/1990 | Kawai et al. | 280/802 |
| 4,909,560 | 3/1990 | Ginn | 296/65 |
| 4,951,963 | 8/1990 | Behr et al. | 280/753 |
| 4,955,452 | 9/1990 | Simonz | 180/27 |
| 5,050,700 | 9/1991 | Kim | 180/268 |
| 5,109,945 | 5/1992 | Koga | 180/273 |
| 5,129,478 | 7/1992 | Suenaga et al. | 180/263 |
| 5,203,440 | 4/1993 | Peterson, Jr. et al. | 192/0.094 |

HALL EFFECT SENSOR ASSEMBLY

REFERENCE TO CO-PENDING APPLICATIONS

Reference is made to the following co-pending patent applications:

Co-pending U.S. patent application Ser. No. 08/199,120, filed Feb. 22, 1994, entitled HYDRAULIC INTERLOCK SYSTEM, assigned to the same assignee as the present application, and is hereby incorporated by reference;

Co-pending U.S. patent application Ser. No. 08/198,957, filed Feb. 18, 1994, entitled TRACTION LOCK, assigned to the same assignee as the present invention and hereby incorporated by reference;

Co-pending U.S. patent application Ser. No. 08/198,847, filed Feb. 18, 1994, entitled INTERLOCK CONTROL SYSTEM FOR POWER MACHINE, now U.S. Pat. No. 5,425,431 hereby incorporated by reference; and Co-pending U.S. patent application Ser. No. 08/198, 285, filed Feb. 18, 1994 entitled OPERATOR PRESENCE SENSOR FOR OPERATOR'S SEAT, assigned to the same assignee as the present invention, and is hereby fully incorporated by reference.

BACKGROUND OF THE INVENTION

The present invention relates to power machinery. More particularly, the present invention relates to a Hall effect sensor assembly for use in controlling operation of power machinery.

Power machines, such as skid steer loaders, typically have a frame which supports a cab and a movable lift arm which, in turn, supports a work tool such as a bucket. The movable lift arm is pivotally coupled to the frame of the skid steer loader by power actuators which are commonly hydraulic cylinders. In addition, the tool is coupled to the lift arm by one or more additional power actuators which are also commonly hydraulic cylinders. An operator manipulating the skid steer loader raises and lowers the lift arm, and manipulates the tool, by actuating the hydraulic cylinders coupled to the lift arm, and the hydraulic cylinder coupled to the tool. When the operator causes the hydraulic cylinders coupled to the lift arm to increase in length, the lift arm moves generally vertically upward. Conversely, when the operator causes the hydraulic cylinders coupled to the lift arm to decrease in length, the lift arm moves generally vertically downward. Similarly, the operator can manipulate the tool (e.g., tilt the bucket) by controlling the hydraulic cylinder coupled to the lift arm and the working tool to increase or decrease in length, as desired.

Skid steer loaders also commonly have an engine which drives a hydraulic pump to, in turn, power hydraulic traction motors which power movement of the skid steer loader. The traction motors are commonly coupled to the wheels through a drive mechanism such as a chain drive.

It is desirable that, under certain circumstances, the lift arm and the tool, or the drive mechanism, or both, be rendered inoperable. For example, in some prior devices, when an operator moves out of proper operating position in the cab of the skid steer loader, the hydraulic cylinders used to raise and lower the lift arm are locked out of operation. In such prior devices, an operator presence switch is coupled to the hydraulic circuit controlling the hydraulic cylinders to render the hydraulic lift cylinders inoperable when the operator presence switch indicates that the operator is out of proper operating position. One example of such a system is set out in the Minor et al U.S. Pat. No. 4,389,154.

In addition, in some prior devices, movable operator restraint bars are provided when the operator restraint bars are moved to a retracted or inoperative position, mechanical brakes or wheel locks lock the wheels of the skid steer loader. One example of such a system is set out in the Simonz U.S. Pat. No. 4,955,452.

SUMMARY OF THE INVENTION

A sensor for a power machine includes a seat bar which is coupled for movement relative to a seat on the power machine. A magnet and a Hall effect sensor are coupled to the seat bar and to the power machine so that they are movable relative to one another based on movement of the seat bar. The seat bar is pivotally movable from a first position to a second position. The Hall effect sensor provides a position sensing signal indicating when the seat bar is in one of the first or second positions.

In another preferred embodiment, a Hall effect sensor assembly is also implemented as a seat sensor. The seat is movable between an occupied position and an unoccupied position. A magnet and a Hall effect sensor are attached to the seat and the power machine so that they move relative to one another when the seat moves between the occupied and unoccupied positions. The Hall effect sensor provides an output signal indicative of seat position.

BRIEF DESCRIPTION OF THE DRAWINGS

FIG. 3A shows the Hall effect sensor assembly of FIG. 3 assembled.

DETAILED DESCRIPTION OF THE PREFERRED EMBODIMENTS

Overview

Figure 1:
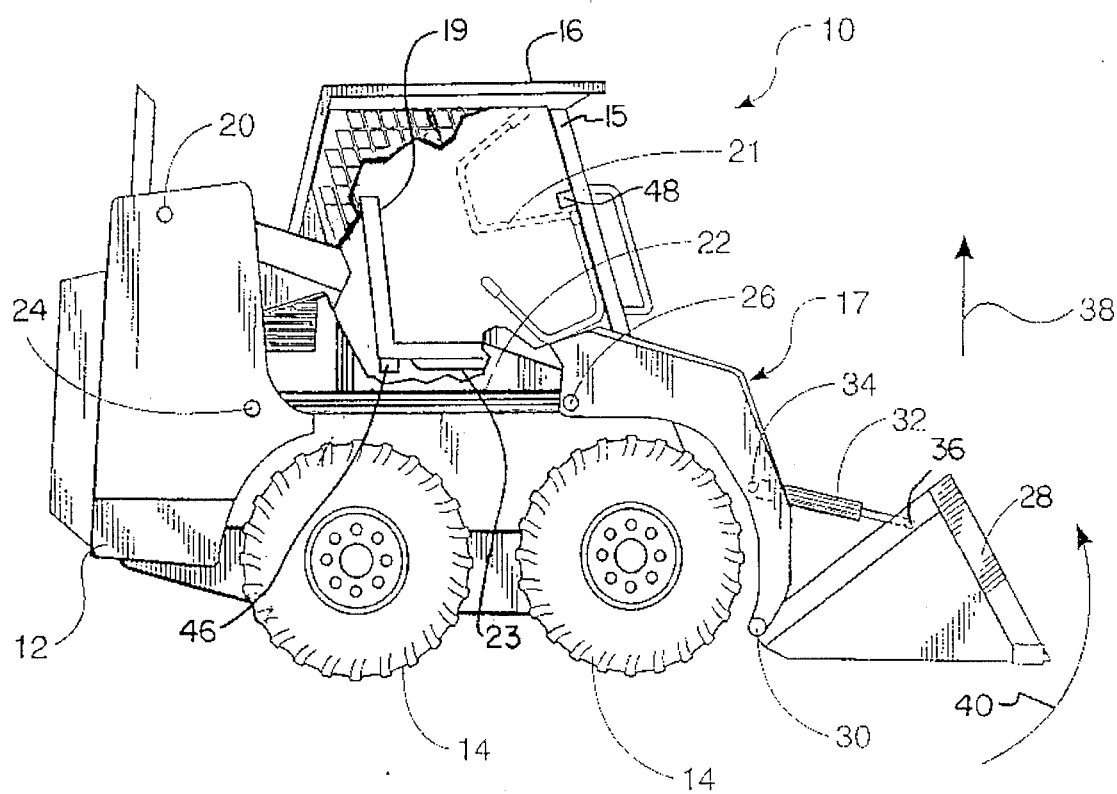
FIG. 1 is a side elevational view of a skid steer loader of the present invention.

FIG. 1 is a side elevational view of a skid steer loader 10 of the present invention. Skid steer loader 10 includes a frame 12 supported by wheels 14. Frame 12 also supports a cab 16 which defines an operator compartment and which substantially encloses a seat 19 on which an operator sits to control skid steer loader 10. Cab 16 includes uprights 15. A seat bar 21 is pivotably coupled to a front portion of cab 16 when the operator occupies seat 19, the operator then pivots seat bar 21 from the raised position (shown in phantom in FIG. 1) to the lowered position shown in FIG. 1.

A lift arm 17 is coupled to frame 12 at pivot points 20 (only one of which is shown in FIG. 1, the other being identically disposed on the opposite side of loader 10). A pair of hydraulic cylinders 22 (only one of which is shown in FIG. 1) are pivotally coupled to frame 12 at pivot points 24 and to lift arm 17 at pivot points 26. Lift arm 17 is also coupled to a working tool which, in this preferred embodiment, is a bucket 28. Lift arm 17 is pivotally coupled to bucket 28 at pivot points 30. In addition, another hydraulic cylinder 32 is pivotally coupled to lift arm 17 at pivot point 34 and to bucket 28 at pivot point 36. While only one cylinder 32 is shown, it is to be understood that any desired number of cylinders could be used to work bucket 28 or any other suitable tool.

The operator residing in cab 16 can manipulate lift arm 17 and bucket 28 by selectively actuating hydraulic cylinders 22 and 32. By actuating hydraulic cylinders 22 and causing hydraulic cylinders 22 to increase in length, the operator moves lift arm 17, and consequently bucket 28, generally vertically upward in the direction indicated by arrow 38. Conversely, when the operator actuates cylinder 22, causing it to decrease in length, bucket 28 moves generally vertically downward to the position shown in FIG. 1.

The operator can also manipulate bucket 28 by actuating cylinder 32. When the operator causes cylinder 32 to increase in length, bucket 28 tilts forward about pivot points 30. Conversely, when the operator causes cylinder 32 to decrease in length, bucket 28 tilts rearward about pivot points 30. The tilting is generally along an arcuate path indicated by arrow 40.

FIG. 1 also shows that seat 19 is movably coupled to frame 12 by leaf spring 23. Leaf spring 23 has sufficient tension such that seat 19 is biased upwardly into an unoccupied position when the operator is not sitting on seat 19. Also, seat 19 is lowered into an occupied position when the operator sits on seat 19.

FIG. 1 further shows, in block diagram form, a pair of sensors 46 and 48. Seat sensor 46 is coupled to seat 19 to detect when seat 19 moves between the occupied position and the unoccupied position. Seat bar sensor 48 is coupled no cab 16 and detects movement of seat bar 21 between the lowered position shown in FIG. 1, and the raised position shown in phantom in FIG. 1. Seat sensor 46 and seat bar sensor 48 will be described in greater detail later in the specification.

Lockout Control Circuit 42

Figure 2:
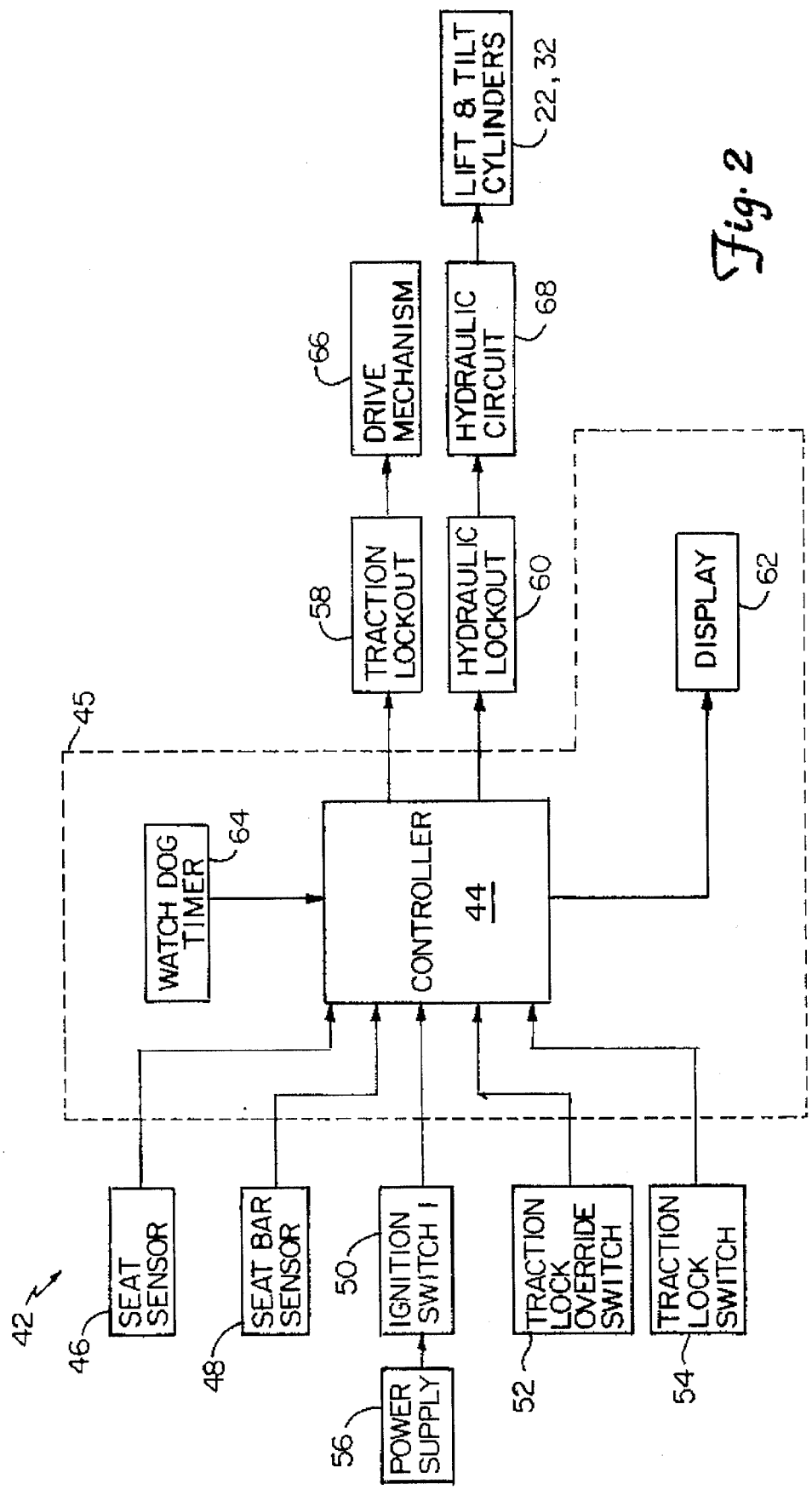
FIG. 2 is a block diagram of a control system of the present invention.

Control circuit 42 (shown in FIG. 2), in the preferred embodiment, includes controller 44 which receives inputs from seat sensor 46, seat bar sensor 48, ignition switch 50, traction lock override switch 52 and traction lock switch 54. Ignition switch 50 is coupled to a power supply 56. Upon closing of ignition switch 50, power is supplied from power supply 56 to the remainder of the system.

Based on the inputs received, controller 44 provides two outputs to traction lock mechanism 58, an output to hydraulic lock mechanism 60 and an output to display 62. Controller 44 also provides an output to watchdog timer 64 which is integrated into controller assembly 45 in the preferred embodiment.

Based on the inputs from controller 44, traction lock mechanism 58 and hydraulic lock mechanism 60 provide outputs to drive mechanism 66 and hydraulic circuit 68. Hydraulic circuit 68, in turn, provides an output to lift and tilt cylinders 22 and 32.

Operation Of Circuit 42

In operation, seat sensor 46 senses whether seat 19 is in the raised, unoccupied position or in the lowered, occupied position, and provides a signal indicative of the position of seat 19. In the preferred embodiment, seat sensor 46 is a Hall effect sensor which is more particularly described later in the specification.

Seat bar sensor 48, in the preferred embodiment, is also a Hall effect position sensor more fully described later in the specification. Seat bar sensor 48 is activated when the operator pulls seat bar 21 into the lowered position shown in FIG. 1. In the preferred embodiment, seat bar sensor 48 provides a signal to controller 44 which is active when seat bar 21 is in the lowered position and inactive when seat bar 21 is in the raised position or in any position other than the lowered position.

Ignition switch 50 is a typical key-type ignition switch used in supplying power from power supply 56 to the basic electrical system in skid steer loader 10. Upon the closure of ignition switch 50, power is also supplied to controller 44 and it senses that switch 50 is closed.

Traction lock switch 54 is an operator-controlled pedal actuated switch accessible from the operator compartment defined by cab 16. The pedal is preferably configured as an over-center device. When the operator actuates traction lock switch 54, traction lock switch 54 provides an input to controller 44 requesting controller 44 to activate traction lock mechanism 58.

Traction lock override switch 52 is a manually operated switch which is also preferably located in the operator compartment defined by cab 16. Switch 52 can be of any suitable configuration, but is preferably a push button switch located on a dash panel in a forward region of the operator compartment.

The traction lock mechanism 58, in the preferred embodiment, comprises the mechanism more fully described in co-pending U.S. patent application Ser. No. 08/198,957, filed on Feb. 22, 1994, assigned to the same assignee as the present application. Briefly, traction lock mechanism 58 locks or unlocks drive mechanism 66 in response to input signals to either preclude movement of skid steer loader 10 or allow movement of skid steer loader 10, respectively.

Hydraulic lock mechanism 60 is more fully described in co-pending U.S. patent application Ser. No. 08/199,120, filed Feb. 22, 1994, assigned to the same assignee as the present invention. Briefly, hydraulic circuit 68 includes hydraulic valves which are actuated to provide fluid under pressure to cylinders 22 and 32 to achieve desired manipulation of cylinders 22 and 32. Hydraulic lock mechanism 60, in the preferred embodiment, includes any number of lock valves interposed between the valves in hydraulic circuit 68 and cylinders 22 and 32. Upon receiving appropriate control signals from controller 44, the lock valves and hydraulic lock mechanism 60 preclude hydraulic circuit 68 from providing fluid under pressure to cylinders 22 and 32, thereby locking cylinders 22 and 32, or allowing only selected operations of cylinders 22.

During normal operation of circuit 42, an operator enters the operator compartment defined by cab 16 and occupies seat 19. The operator then lowers seat bar 21 into the lowered position shown in FIG. 1. The operator then closes ignition switch 50 supplying power to the basic electrical system, to controller assembly 45 and to the remainder of the control system. Seat sensor 46 and seat bar sensor 48 provide signals to controller 44 indicating that seat 19 is occupied and that seat bar 21 is in the lowered position.

upon receiving such signals, controller 44 provides appropriate signals to traction lock mechanism 58 to unlock drive mechanism 66 and allow movement of loader 10; and to hydraulic lock mechanism 58 to unlock hydraulic circuit 68 and allow manipulation of hydraulic cylinders 22 and 32.

Also, controller 44 provides display signals to display 62 which indicate that seat 19 is occupied, seat bar 21 is in the lowered position, hydraulic lock mechanism 60 has been sent a signal by controller 44 to unlock hydraulic circuit 68, traction lock mechanism 58 has been sent a signal by controller 44 to unlock drive mechanism 66 and controller 44 does not detect any system problems.

If controller 44 has not received a signal from seat sensor 46 indicating that seat 19 is occupied, and has not received a signal from seat bar sensor 48 indicating that seat bar 21 is in the down position (shown in FIG. 1) controller 44 provides appropriate signals to traction lock mechanism 58 and hydraulic lock mechanism 60 locking drive mechanism 66 and hydraulic circuit 68, respectively.

It has been observed that, during normal operation of loader 10, the operator may occasionally bounce off of seat 19. When this occurs, seat sensor 46 provides momentary signals to controller 44 indicating that seat 19 is no longer occupied. Therefore, in the preferred embodiment, once seat sensor 46 indicates that seat 19 is occupied and seat bar sensor 48 indicates that seat bar 21 is in the lowered position, controller 44 requires that seat sensor 46 provide a signal indicating that seat 19 is unoccupied for at least one second. Then, controller 44 provides an output to hydraulic lock mechanism 60 locking hydraulic circuit 68 but controller 44 does not lock drive mechanism 66. In this preferred embodiment, drive mechanism 66 remains unlocked until either seat bar 21 is lifted out of the lowered position shown in FIG. 1, or until traction lock switch 54 is actuated.

If, during operation of loader 10, the operator raises seat bar 21 to the raised position shown in phantom in FIG. 1, seat bar sensor 48 provides controller 44 with a signal indicating that seat bar 21 has been raised. Controller 44 then provides output signals to traction lock mechanism 58 to lock drive mechanism 66 and hydraulic lock mechanism 60 to lock hydraulic circuit 68.

A more detailed description of control circuit 42, including a description of the traction lock switch function, the traction lock override function and error mode operation, is set out in co-pending U.S. patent application Ser. No. 08/198,847, filed Feb. 18, 1994, entitled INTERLOCK CONTROL SYSTEM FOR POWER MACHINE, hereby incorporated by reference.

Seat Bar Sensor 48

Figure 3:
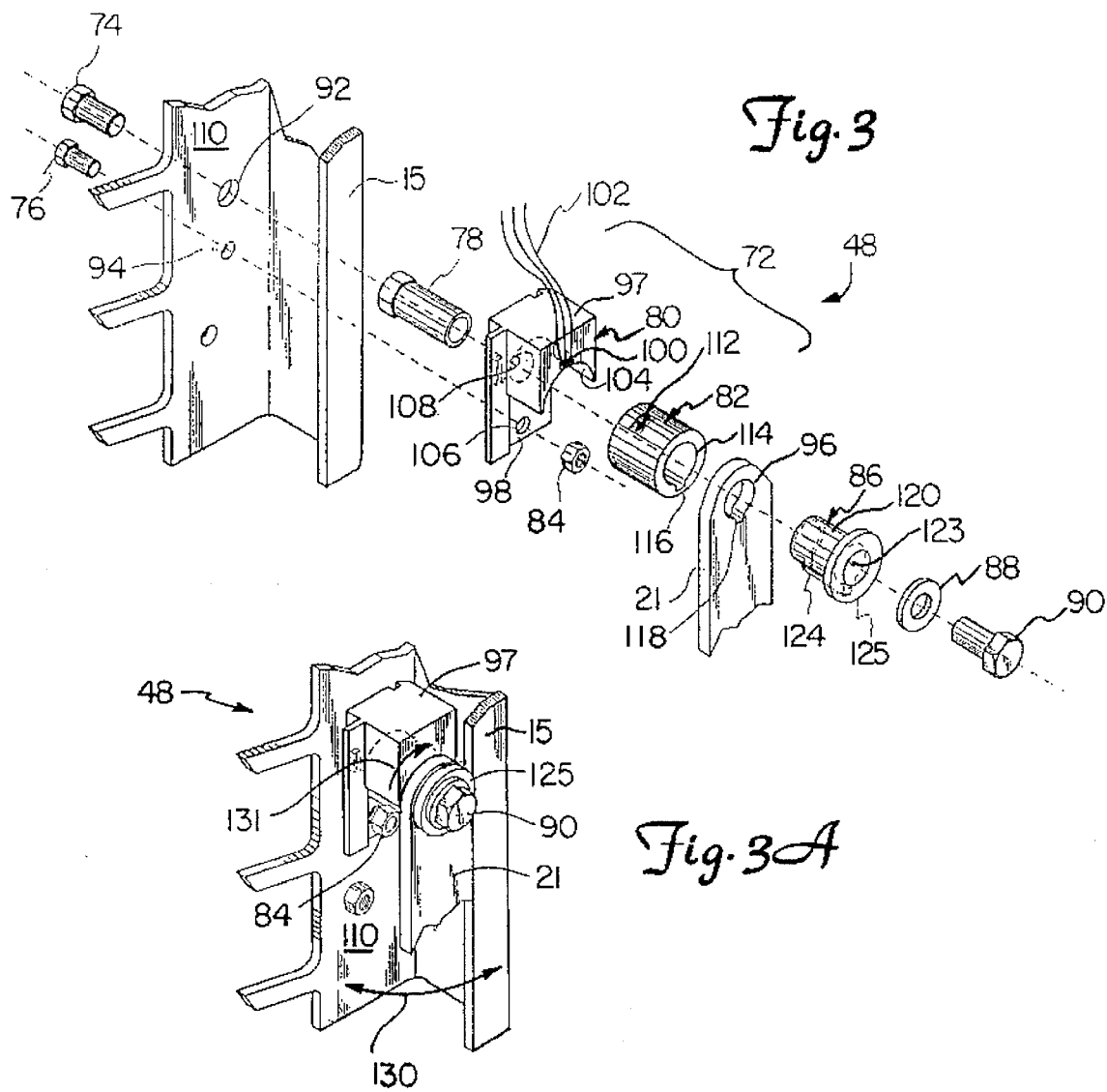
FIG. 3 is an exploded view of a Hall effect sensor assembly for the operator bar of the present invention.

FIG. 3 shows an exploded view of seat bar sensor 48. Seat bar sensor 48 includes Hall effect sensor assembly 72 coupled to upright 15 of cab 16 and to seat bar 21. Only the portion of seat bar 21 which is pivotally coupled to upright 15 of cab 16 is shown in FIG. 3. Similarly, only a portion of upright 15 is shown for the sake of clarity.

Seat bar sensor assembly 72 includes bolts 74 and 76, sleeve 78, sensor housing 80, collar 82, nut 84, keyed shaft 86, washer 88 and bolt 90. In addition, upright 15 is provided with apertures 92 and 94, and seat bar 21 is provided with aperture 96.

Bolts 74 and 76 extend into apertures 92 and 94, respectively. Sleeve 78 has a threaded interior bore which is threadably connected to bolt 74. Sensor housing 80 includes a sensor block portion 97 and a mounting plate portion 98 which are preferably formed integrally with one another. Sensor block portion 97 houses Hall effect sensor element 100 which is connected, by conductors 102, to controller 44. Hall effect sensing element 100 is mounted in sensor block portion 97 proximate an inner hemispheric surface 104.

Mounting plate 98 includes a pair of apertures 106 and 108 (shown in phantom in FIG. 3).

Once sleeve 78 is threaded onto bolt 74, aperture 108 in housing 80 slides over sleeve 78, and aperture 106 slides over bolt 76. Nut 84 is then threadably secured to bolt 76 thereby securing housing 80 to surface 110 of upright 15. Apertures 106 and 108 are aligned such that sleeve 78 extends through aperture 108 in mounting plate Collar 82 holds a magnet 112. Collar 82 is slid over the portion of sleeve 78 which protrudes beyond aperture 108 in mounting plate 98. Collar 82 includes an axial bore 114 which includes a key slot 116. Bore 114 is dimensioned to generally equal the dimensions of aperture 96 in seat bar 21. In addition, aperture 96 is provided with a key slot 118 which coincides with key slot 116 in aperture 114 of collar 82.

Keyed shaft 86 includes shaft portion 120 which has an axially disposed lip 124, and an annular ring portion 125. Axial bore 123 extends through shaft portion 120 and annular ring portion 125. The exterior perimeter of shaft portion 120 is sized just smaller than the interior perimeter of both aperture 96 and axial bore 114. In addition, lip 124 is sized to just fit within key slots 116 and 118. Therefore, once collar 82 is positioned over shaft 78, aperture 96 is aligned with bore 114 such that key slots 116 and coincide. Then, shaft portion 120 of keyed shaft 86 inserted through aperture 96 and into axial bore 114 of collar 82 so that lip 124 is disposed within key slots 116 and 118 locking seat bar 21 and collar 82 together for pivotal movement about sleeve 78.

Finally, washer 88 is positioned over annular ring portion 125 of keyed shaft 86, and bolt 90 is inserted through washer 88, into the axial bore 123 defined by shaft portion 120. Bolt 90 has a threadable shaft which is sized to threadably mate with the interior of sleeve 78. This locks the entire Hall effect sensor assembly 72 into place for pivotal movement about sleeve 78 and relative to upright 15.

FIG. 3A illustrates seat sensor 48 fully assembled. Seat bar 21 is coupled for pivotal movement relative to upright 15, about shaft 78, in the direction indicated by arrow 130. When seat bar 21 is in the lowered position, shown in FIGS. 1 and 3A, collar 82 is positioned such that magnet 112 is disposed adjacent Hall effect sensing element 100. Thus, element 100 provides a signal, via conductors 102, to controller 44 indicating that the seat bar 21 is in the lowered position. However, when the operator raises seat bar 21 to essentially any position other than the lowered position (such as the raised position shown in phantom in FIG. 1) magnet 112 rotates forward relative to sensor block 96 in the direction indicated by arrow 131 and is no longer disposed adjacent Hall effect sensing element 100. This causes the signal provided via conductors 102 to change state, indicating to controller 44 that the seat bar 21 is in a position other than the lowered position. Thus, controller 44 controls circuit 42 accordingly.

Seat Sensor 46

Figure 4:
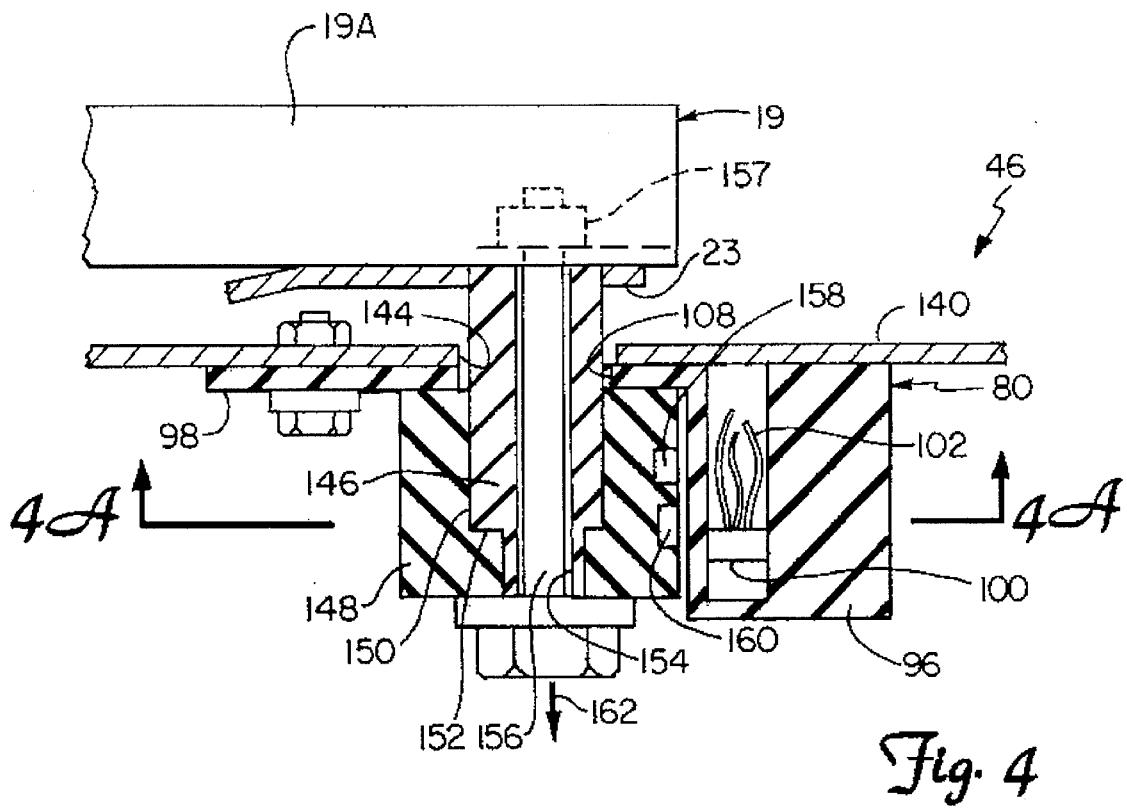
FIG. 4 is a side sectional view of a Hall effect sensor assembly used as a seat sensor according to the present invention.

FIG. 4 is a sectional view of seat sensor 46 of the present invention. In many respects, seat sensor 46 is similar to seat bar sensor 48. Similar items are similarly numbered in FIGS. 3, 3A, 4 and 4A. FIG. 4 shows that a generally horizontal operator support portion 19A of seat 19 is movably supported above a base plate 140 by leaf spring 23. Leaf spring 23 is described in greater detail in co-pending U.S. patent application Ser. No. 08/198,285 filed Feb. 18, 1994 assigned to the same assignee as the present invention.

Base plate 140 includes an aperture 144 which is dimensioned similar to aperture 108 in mounting plate 98 of Hall effect sensor housing 80. A sleeve 146, dimensioned to fit within apertures 108 and 144, extends from a lower portion of seat 19, through leaf spring 23, through apertures 108 and 144, and out sensor block portion 97 in housing 80. A magnet supporting bushing 148 has an inner bore 150 which is sized just larger than the exterior surface of sleeve 146. Sleeve 146 has a stepped outer surface 152 which coincides with a stepped inner surface of axial bore 150. Sleeve 146, in turn, has an axial bore 154 extending therethrough. A bolt 156 extends through axial bore 154 and is threadably and securely connected within seat 19 at threaded receiving aperture 157 in seat 19.

A pair of oppositely polarized magnets 158 and 160 are supported within bushing 148 adjacent surface 104 of housing 80. From this arrangement, it can be seen that sleeve 146, bushing 148, magnets 158 and 160, and bolt 156 are all securely and rigidly coupled to seat 19 and leaf spring 23. However, they are movable, with movement of sleeve 146 through apertures 108 and 144, relative to base plate 140 and Hall effect sensor block portion 97.

Figure 4A:
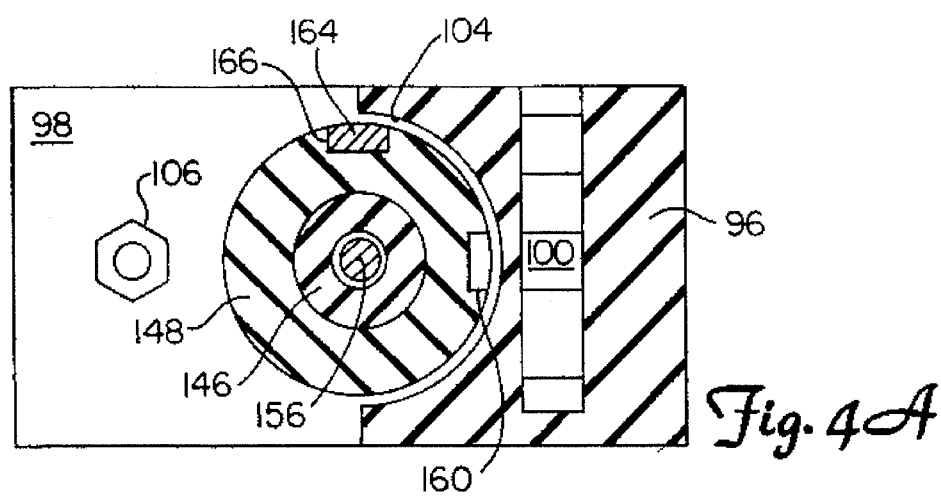
FIG. 4A is a bottom sectional view along section lines 4A—4A shown in FIG. 4.

In the preferred embodiment shown in FIGS. 4 and 4A, when seat 19 is unoccupied, or when the operator is in an improper operating position off of seat 19, leaf spring 23 biases seat 19 in the upward direction so that bushing 148 is in the position shown in FIG. 4 with a first pole of magnet 160 (i.e., north or south) adjacent Hall effect sensor element 100. When bushing 148 is in this position, Hall effect sensing element 100 provides controller 44 with a signal via conductors 102 which indicates that either seat 19 is unoccupied, or the operator is in an improper operating position.

However, when sufficient weight is applied to seat 19, seat 19, and consequently bushing 148, move downward in the direction indicated by arrow 162. This causes magnet 160 to move away from Hall effect sensing element 100, and causes a pole of magnet 158 (opposite the first pole of magnet 160) to move into a position directly adjacent Hall effect sensing element 100. The opposite polarization of magnets 158 and 160 cause Hall effect sensing element 100 to be subjected to a large change in the field strength of the magnetic field influencing Hall effect sensing element 100. This causes element 100 to quickly provide an output signal via conductors 102 to controller 44 indicating that the operator has resumed occupancy in seat 19. Controller 44 then controls the remainder of circuit 42 in the appropriate fashion.

FIG. 4A shows another feature of seat sensor 46 of the present invention. In the preferred embodiment, mounting plate 98 is provided with a key tab 164. In addition, bushing 148 is provided with a key slot 166. Key slot 166 is sized to elide over key tab 164 so that movement is possible between the seat occupied position (in which magnet 158 is disposed adjacent Hall effect sensing element 100) and the seat unoccupied position shown in FIG. 4. However, the arrangement of key tab 164 and key slot 166 precludes bushing 148 from rotating about sleeve 146 in which case magnets 158 and 160 would be out of alignment with Hall effect sensing element 100.

Conclusion

The present invention provides a new and advantageous Hall effect sensor assembly for use on a skid steer loader. The Hall effect sensor assembly can be used, in large part, as both the seat sensor 46 and the seat bar sensor 48. The seat bar sensor 48 is provided such that the magnets in the assembly are mounted for pivotal movement relative to the Hall effect sensing element with movement of the seat bar 21 relative to the seat 19. In the seat sensor configuration, the sensor assembly includes two oppositely polarized magnets disposed proximate the Hall effect sensing element 100. When the seat 19 is in the occupied position, one of the magnets is positioned such that its magnetic field influences the Hall effect sensing element 100. When the seat is in the unoccupied position, the other oppositely polarized magnet is positioned such that its magnetic field influences the Hall effect sensing element 100. This arrangement provides for a versatile and cost effective sensor assembly.

It should be noted that, in the preferred embodiment, the entire length of movement of the bushing 148 in seat sensor 46 is approximately 0.2 to 0.3 inches. A minimum of 0.5 volts differential in output is preferably provided by the Hall effect sensing element when indicating that the seat is in the occupied and unoccupied positions.

It should also be noted that the conductors 102 connected between the Hall effect sensing element 100 and controller 44 include a three-wire connection which is polarity protected in reference to the power and ground supply terminals, In addition, the conductors 102 are short circuit protected and are configured in a known manner so as not to be damaged by an open circuit connection.

Also, in seat bar sensor 48, magnet 112 is positioned in collar 82 (which is preferably plastic). Hall effect sensing element 100 is preferably located above the collar 82 on upright 15. This preferred positioning on loader 10 provides certain advantages in operation. When the seat bar 21 is rotated downward, the magnet 112 is located directly below the sensing element 100. As the seat bar 21 is rotated up, the magnet 112 approaches the front of the cab 16 which draws the magnetic field from the sensing element 100, and this assists in changing the output of the sensing element 100. As with seat sensor 46, a minimum of 0.5 volts differential in output is preferred in the output signal from sensing element 100. The seat bar sensor 48 is also preferably a three-wire device with wires to the Hall effect sensing element 100 polarity protected in reference to the power and ground supply terminals. The conductors are also short circuit protected and configured in a known manner so as not to be damaged by an open circuit connection.

Although the present invention has been described with reference to preferred embodiments, workers skilled in the art will recognize that changes may be made in form and detail without departing from the spirit and scope of the invention.

What is claimed is:

1. An apparatus for controlling operation of a skid steer loader having a frame, a seat supported by the frame, wheels supporting the frame, a drive mechanism for driving the wheels, a lift arm structure manipulated by power actuators, and a power circuit for controlling the power actuators, the apparatus comprising:

a seat bar coupled to the frame for movement relative to the seat;

a first Hall effect sensor assembly, coupled to the seat bar, for sensing position of the seat bar and providing a seat bar sensor signal indicative of the position of the seat bar;

a second Hall effect sensor assembly, coupled to the seat, for sensing seat position and providing an occupancy signal indicative of the seat position;

a controller, coupled to the first Hall effect sensor assembly and the second Hall effect sensor assembly, for receiving the seat bar sensor signal and the occupancy signal and providing a traction output signal, a power output signal, and a display output signal, based on the seat bar sensor signal and the occupancy signal;

traction lock means, coupled to the drive mechanism and the controller to receive the traction output signal, for locking the drive mechanism to preclude the drive mechanism from driving the wheels based on the traction output signal;

power lock means, coupled to the power circuit and the controller to receive the power output signal, for locking out operation of the power actuators based on the power output signal; and display means, coupled to the controller, for displaying indicia indicative of an operational state based on the display output signal.

2. The apparatus of claim 1 wherein the seat is moveable between an occupied position and an unoccupied position, and wherein the second Hall effect sensor assembly comprises:

a magnet housing coupled to the seat;

a first magnet having a first and a second pole and being supported by the magnet housing;

a second magnet, having a first and second pole and being supported by the magnet housing; and a Hall effect sensor coupled to the frame proximate the magnet housing so that the first magnet is sensed by the Hall effect sensor when the seat is in the unoccupied position and so the second magnet is sensed by the Hall effect sensor when the seat is in the occupied position.

3. The apparatus of claim 2 wherein the first and second magnets each have a north pole and a south pole and wherein the first and second magnets are arranged on the magnet housing so that one of the north and south poles of the first magnet is proximate the Hall effect sensor when the seat is in the unoccupied position and so that the other of the north and south poles of the second magnet is proximate the Hall effect sensor when the seat is in the occupied position.

4. The apparatus of claim 1 wherein the seat bar is moveable between a first position relative to the seat and a second position relative to the seat, and wherein the first Hall effect sensor assembly comprises:

a magnet housing coupled to the seat bar;

a magnet supported by the magnet housing; and a Hall effect sensor, coupled to the frame proximate the magnet housing, so the Hall effect sensor senses when the seat bar is in the first position based on a position of the magnet.

5. The apparatus of claim 4 wherein the seat bar is moved closer to the seat when in the first position than when in the second position, and wherein the magnet is located on the magnet housing so the magnet is proximate the Hall effect sensor when the seat bar is in the first position and so the magnet is moved away from the Hall effect sensor when the seat bar is in the second position.

6. A sensor on a power machine having a seat, the sensor comprising:

a seat bar mounted to the power machine for pivotal movement relative to the power machine between a first position and a second position;

a Hall effect sensor assembly coupled to the power machine and the seat bar to sense movement of the seat bar between the first and second positions;

the Hall effect sensor assembly including:

a magnet;

a Hall effect sensor;

a magnet housing coupled to one of the seat bar and the frame, the magnet being supported by the magnet housing; and the Hall effect sensor being coupled to another of the seat bar and the frame proximate the magnet housing so the Hall effect sensor senses when the seat bar is in the first position based on a position of the magnet.

7. The apparatus of claim 6 wherein the seat bar is pivoted closer to the seat when in the first position than when in the second position, and wherein the magnet is located on the magnet housing so the magnet is proximate the Hall effect sensor when the seat bar is in the first position and so the magnet is pivoted away from the Hall effect sensor when the seat bar is in the second position.

8. The sensor of claims 7 wherein the power machine includes a frame and wherein the magnet is mounted such that the frame attracts a magnetic field provided by the magnet when the seat bar is pivoted to the second position.

9. The sensor of claim 7 wherein the magnet housing comprises a plastic collar, and wherein the Hall effect sensor comprises a sensing element housed in a housing having a generally hemispherically concave outer surface, the collar being mounted for rotational movement adjacent the outer surface.

* * * * *